United States Patent [19]

Rossi

[11] Patent Number: 5,037,022
[45] Date of Patent: Aug. 6, 1991

[54] VEHICLE BODY WELDING ASSEMBLY SYSTEM

[75] Inventor: Cristiano G. Rossi, Birmingham, Mich.

[73] Assignee: Chrysler Corporation, Highland Park, Mich.

[21] Appl. No.: 461,582

[22] Filed: Jan. 5, 1990

[51] Int. Cl.[5] ............................................. B23P 21/00
[52] U.S. Cl. ........................................ 228/47; 29/430; 29/799; 29/824; 248/679; 264/35
[58] Field of Search ............... 228/47 A; 264/35, 274, 264/277; 52/367; 248/679; 29/430, 799, 824

[56] References Cited

U.S. PATENT DOCUMENTS

| | | | |
|---|---|---|---|
| 2,624,107 | 1/1953 | Carpenter | 269/7 |
| 4,448,341 | 5/1984 | Fujikawa et al. | 228/47 A |
| 4,616,395 | 10/1986 | Farese et al. | 264/35 |
| 4,875,280 | 10/1989 | Fujioka et al. | 29/430 X |
| 4,928,386 | 5/1990 | Schupp et al. | 29/824 |
| 4,937,929 | 7/1990 | Nokajima et al. | 29/430 |

Primary Examiner—Kenneth J. Ramsey
Attorney, Agent, or Firm—Edward A. Craig

[57] ABSTRACT

The present invention is a vehicle body welding assembly system including at least one working cell. The assembly system also includes a carrier for transporting preassembled vehicle bodies to the working cell. A pallet is operatively connected to the carrier and suspended above a support surface by the carrier. A plurality of locator pins are operatively attached to the pallet means for supporting the vehicle body in spaced relation to the pallet means. A plurality of clamping means are secured to the support surface in precise positions for locating and removably securing the locator pins to the clamping means to allow successive vehicle bodies to be accurately and repeatedly located in a precise spaced relation within the one or more successive working cells.

11 Claims, 4 Drawing Sheets

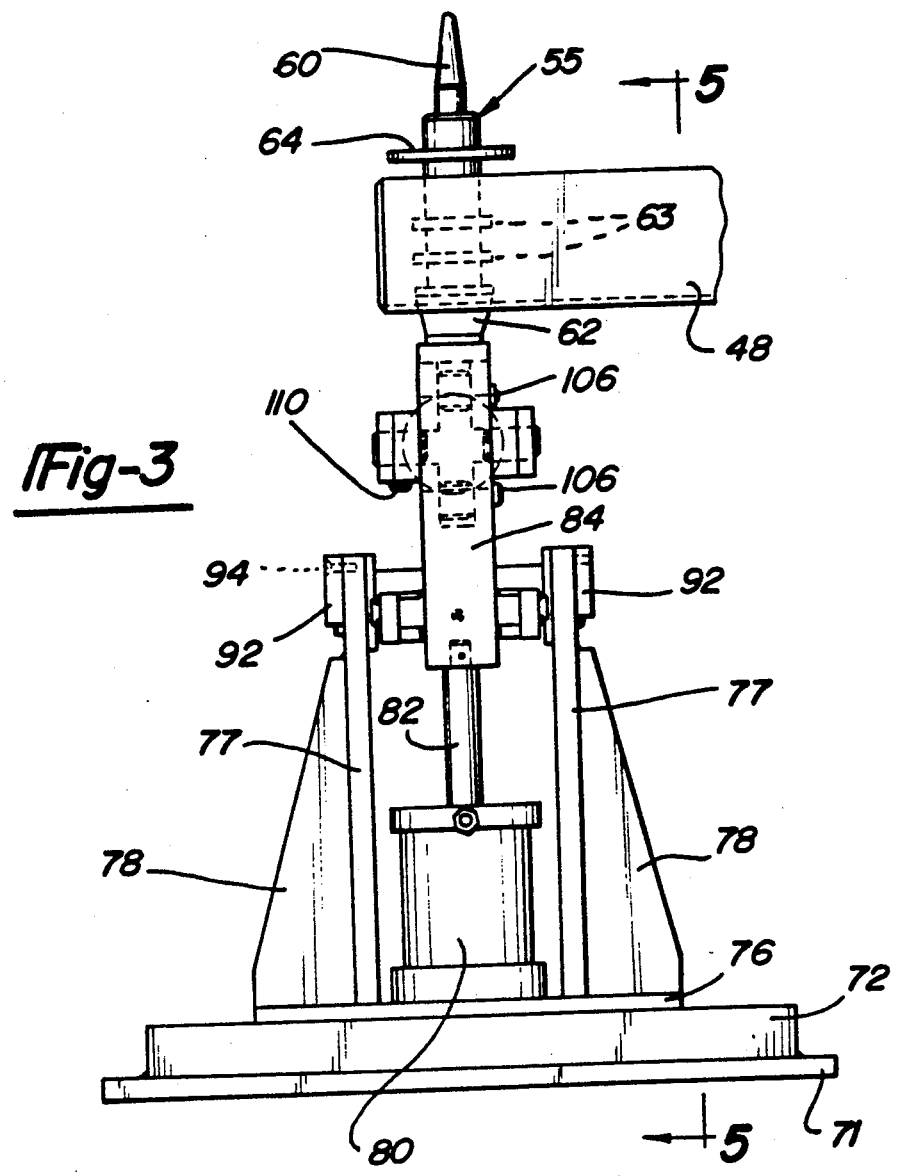
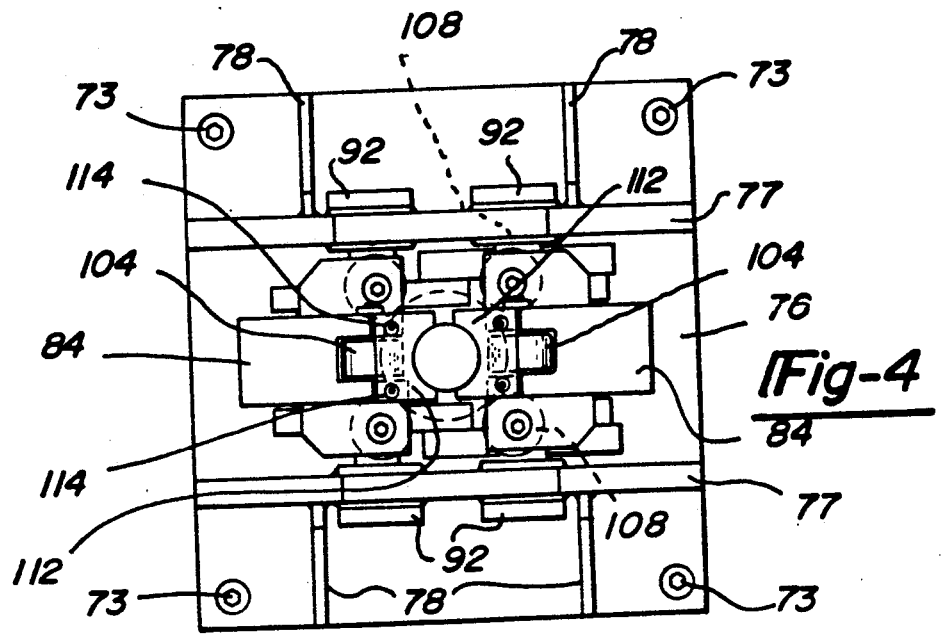

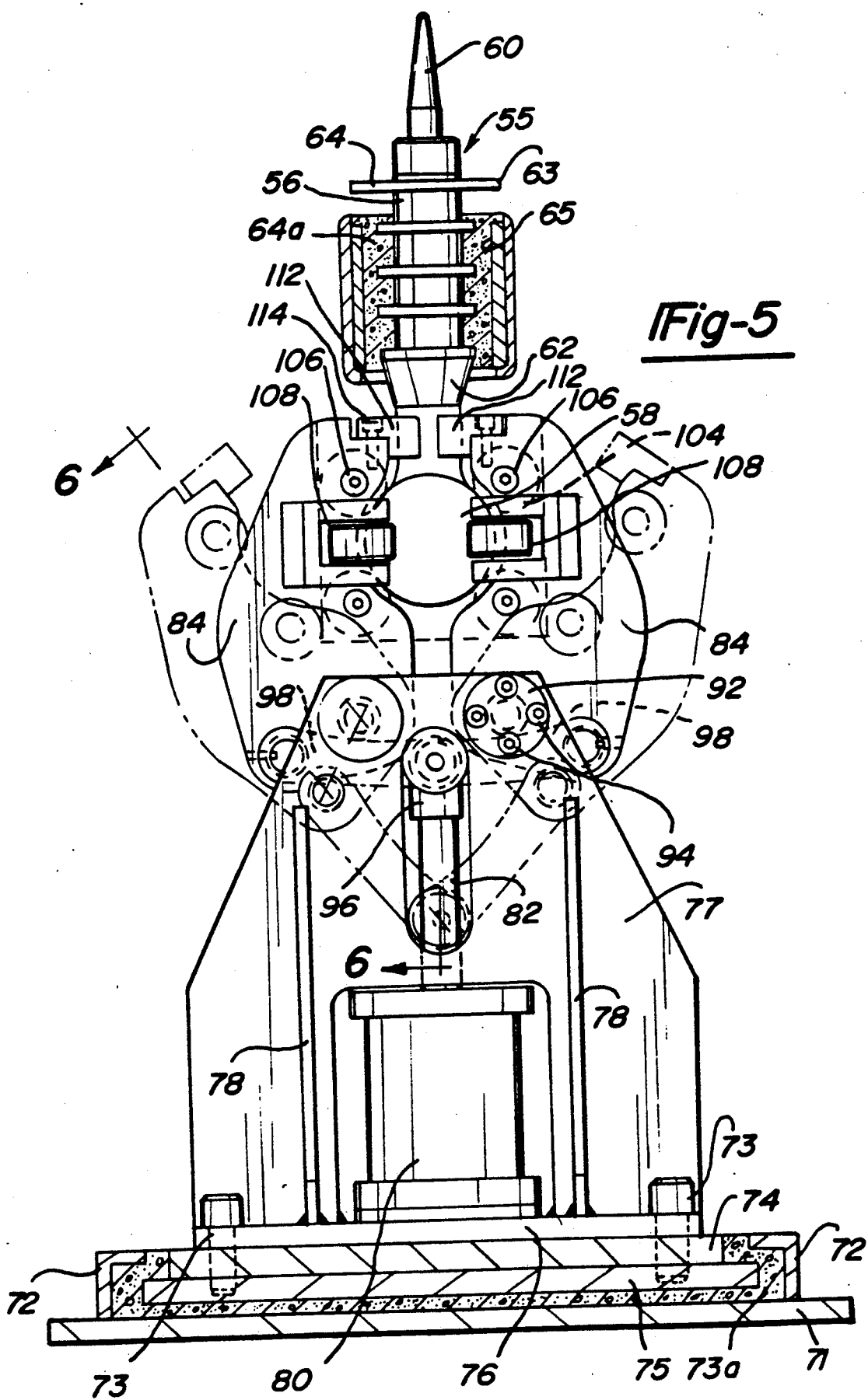

VEHICLE BODY WELDING ASSEMBLY SYSTEM

BACKGROUND OF THE INVENTION

1. Field of the Invention

The present invention relates generally to automotive vehicle bodies, and more particularly, to an assembly system for welding automotive vehicle bodies.

2. Description of Related Art

Currently, there exists assembly systems for welding together automotive vehicle bodies by programmable robots which provide respot or finish welding at successive welding stations. Examples of such an assembly system are disclosed in U.S. Pat. Nos. 4,162,387 and 4,256,947 by inventor De Candia. These assembly systems typically include a plurality of holding carrier pallets, each provided with locator pins, upon which the lower surface of a preassembled "body in white", composed of provisionally connected stamped sheet metal elements, rests. The pallets include clamping devices to clamp this preassembled body in white on the pallet in a predetermined position. A carrier supports the pallets and transfers the pallets along a route passing through one or more "framing" welding stations. Each framing welding station includes a programmable robot to perform the welding and interchangeable holding side frames hereafter called "side gates" able to engage a preassembled body in white supported by the pallet.

One disadvantage of the above patented assembly systems is that the body in white resting on the locator pins has to be located relative to the pallet which, in turn, has to be located relative to the carrier. As a result, the locator pins are located indirectly through the pallet. Since the dimensional accuracy of the pallets may vary, the accuracy in the reference location of the body in white may vary. This may affect welding quality and repeatability. Another disadvantage is that all pallets must all be dimensionally the same to control the accuracy of locating the body in white. This results in a large cost in fabricating the pallets. Yet another disadvantage is that the operational equipment used to transfer and locate the pallet must be maintained in good condition. Otherwise, the accuracy in locating the pallet may vary.

SUMMARY OF THE INVENTION

It is, therefore, one object of the present invention to provide an assembly system for welding vehicle bodies.

It is another object of the present invention to provide an assembly system in which the locator pins are located or referenced directly, thereby increasing welding quality and repeatability.

It is yet another object of the present invention to provide an assembly system which does not locate the pallet, thereby allowing the dimensions of the individual pallets to vary.

It is still yet another object of the present invention to provide an assembly system in which the operational equipment does not need to be maintained in good condition on a daily basis to ensure the accuracy in locating the pallet.

Briefly stated, to accomplish the foregoing objects, the present invention is a vehicle body welding assembly system including at least one working cell. The assembly system also includes a carrier for transporting preassembled vehicle bodies to the working cell. A pallet means is operatively connected to the carrier and suspended above a support surface by the carrier. A locator means is operatively attached to the pallet means for supporting the vehicle body in spaced relation to the pallet means. A clamping means is secured to the support surface for locating and removably securing the locator means to the clamping means to allow the vehicle body to be located in spaced relation within the working cell.

One advantage of the present invention is that the locator pins, upon which the body in white sits, is directly located by the clamping devices instead of through the pallet. This results in a higher level of accuracy and repeatability than present systems. As a result, the present invention does not require precise positioning or dimensional accuracy of the pallet. Another advantage is that the equipment does not need regular maintenance to ensure the locational accuracy of the body in white.

BRIEF DESCRIPTION OF THE DRAWINGS

FIG. 3 is an elevational view of a locator pin and clamping device of FIG. 1.

FIG. 4 is a plan view of the locator pin and clamping device of FIG. 3.

FIG. 5 is an elevational view of the locator pin and clamping device taken along line 5—5 of FIG. 3.

DESCRIPTION OF THE PREFERRED EMBODIMENT

Figure 1:
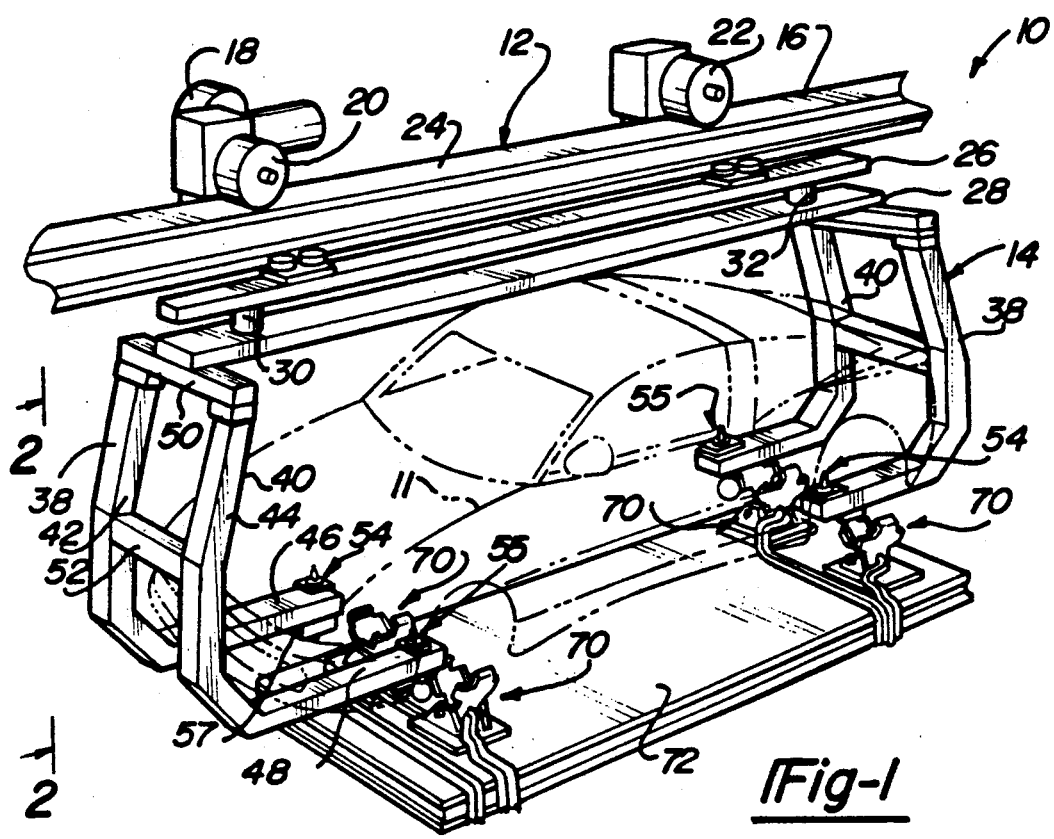
FIG. 1 is a perspective view of a standard working cell for an assembly system according to the present invention with a body in white shown in phantom lines.
Figure 2:
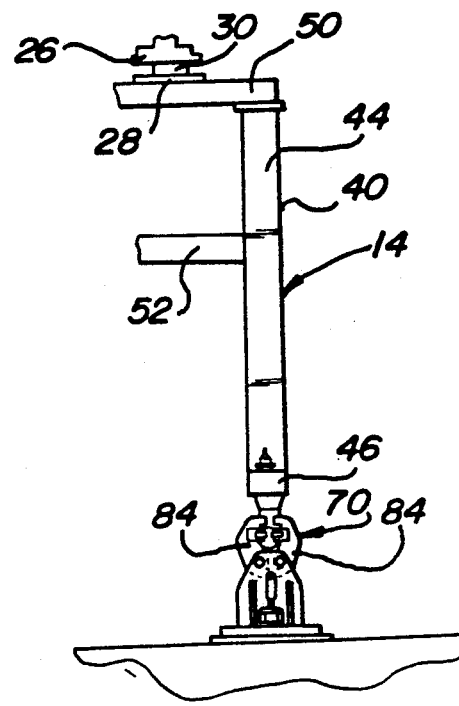
FIG. 2 is a partial elevational view of the working cell taken along line 2—2 of FIG. 1.
Figure 6:
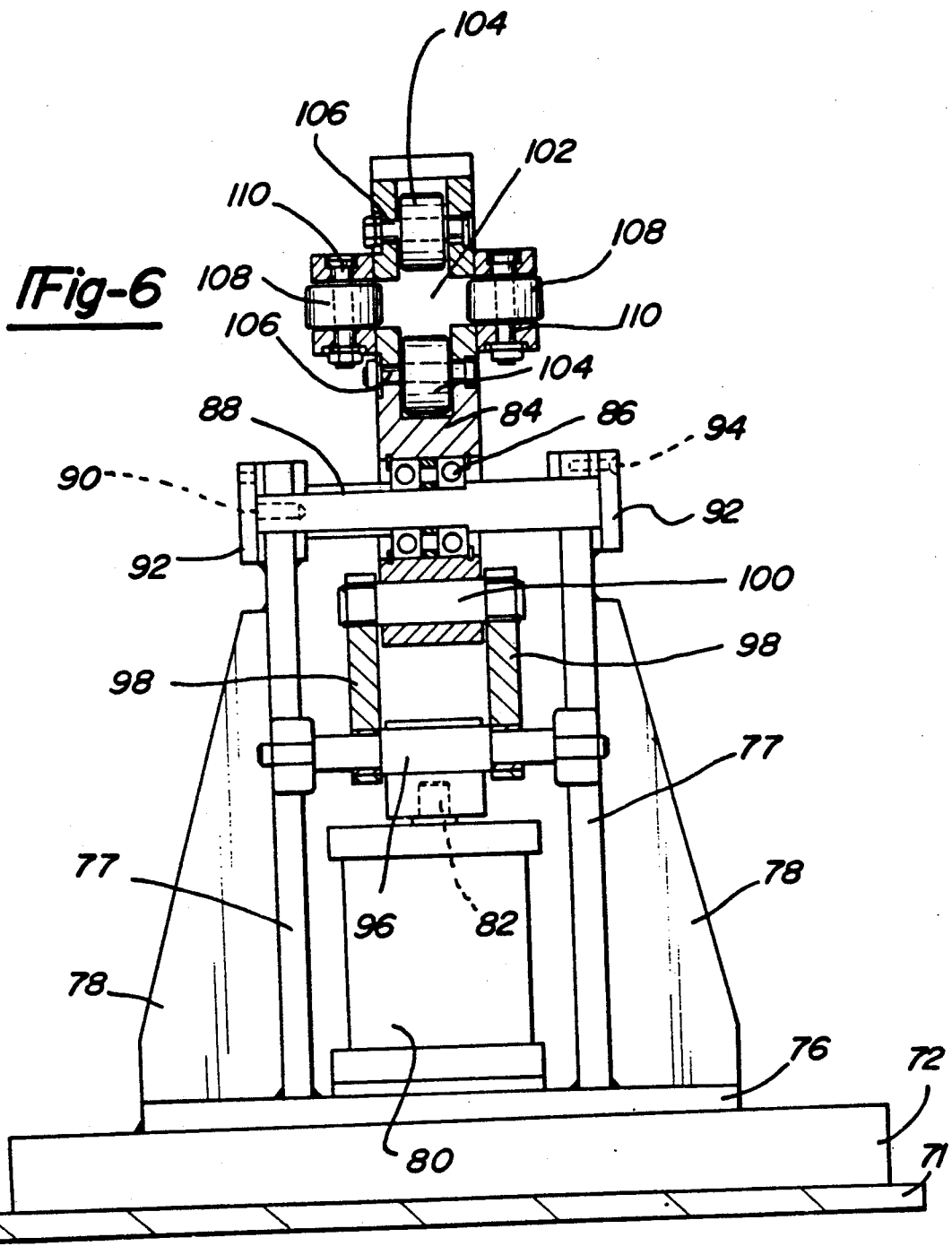
FIG. 6 is a sectional view taken along line 6—6 of FIG. 5.

Referring to FIG. 1, a standard working or locating cell of an assembly system 10 for welding vehicle bodies, such as a preassembled vehicle body or body in white, 11 is shown. The assembly system 10 includes a monorail carrier, generally indicated at 12, for transporting vehicle bodies 11 from one working cell to another. More specifically, the carrier 12 is used to transfer or transport a pallet, according to the present invention and generally indicated at 14, which supports a vehicle body 11.

The carrier 12 includes a rail 16 extending longitudinally and supported above a support surface such as a floor of a building. The rail 16 is generally shaped as an "I" beam. The carrier 12 also includes a drive mechanism 18 for moving the pallet 14 along the rail 16. The carrier 12 further includes a pair of longitudinally spaced rollers 20 and 22 which ride or travel along an upper surface 24 of the rail 16. The pallet 14 is connected by suitable means to the drive mechanism 18 and is suspended below the rail 16 above the support surface. It should be appreciated that the carrier 12 is conventional and known in the art.

The pallet 14 includes a pair of longitudinally extending and vertically spaced support plates 26 and 28. A pair of longitudinally spaced cylindrical columns 30 and 32 interconnect the support plates 26 and 28. The columns 30 and 32 have a plurality of leaf springs (not shown) disposed therein to provide relative vertical movement between the lower support plate 28 and the upper support plate 26. The upper support plate 26 includes a pair of rollers 34 and 36 at spaced locations therealong to engage the rail 16.

The pallet 14 also includes a pair of laterally spaced and generally "L" shaped pallet arms 38 and 40 at each end of the lower support plate 28. The pallet arms 38 and 40 have a generally vertical portion 42 and 44, respectively, and a generally horizontal portion 46 and 48. The vertical portions 42 and 44 of the pallet arms 38 and 40 are secured by means such as welding to a lateral end of a generally horizontal end member 50. The end member 50 is secured by means such as welding to the longitudinal end of the lower support plate 28. The end member 50 is orientated substantially perpendicular to the lower support plate 28. A horizontal support member 52 is secured to the vertical portions 42 and 44 of the pallet arms 38 and 40 to provide additional support and to maintain the transverse or lateral spacing of the pallet arms 38 and 40.

Referring to FIGS. 2 through 6, the horizontal portions 46 and 48 include a locator pin, generally indicated at 54 and 55, respectively, at the free end thereof to support the vehicle body 11. The locator pin 54 has a cylindrical body 56 having a cylinder or cylindrically shaped lower end 57 and the locator pin 55 has a cylindrical body 56 and having a ball or spherically shaped lower end 58. Both locator pins 54 and 55 have an inverted "V" or point shaped upper end 60. The lower end 57 has a diameter greater than the cylindrical body 56 while the upper end 60 has a diameter less than the cylindrical body 56. The cylindrical body 56 includes an enlarged frustoconical shaped portion 62 and a plurality of vertically spaced and radially extending rings 63. A radially extending flange 64 is located above an upper surface of the horizontal portion 46 and 48 of the pallet arms 38 and 40 and is vertically spaced between the upper most of the rings 63 and the upper end 60. A filler material 64a such as urethane is poured into and cured within a hollow portion 65 of the horizontal portions 46 and 48 to secure the locator pins 54 and 55 within the pallet arms 38 and 40. It should be appreciated that the vehicle body 11 rests upon the upper end of the locator pins 60. It should also be appreciated that the cylinder and ball of the lower end of the locator pins define a plane in space by the position of a point and position of a line.

The assembly system 10 also includes a plurality of clamping devices, generally indicated at 70, for locating and securing the pallet 14 in position within the working cell. More specifically, a working cell of the assembly system 10 includes four clamping devices 70, for the two pairs of locator pins 54 and 55. The clamping devices 70 operatively cooperate with the cylindrically and spherically shaped lower ends 57 and 58 of the locator pins 54 and 55, respectively, to locate and temporarily or removably secure the locator pins 54 and 55 within the working cell.

Referring to FIG. 5, a plate 71 is secured by suitable means such as fasteners (not shown) to the support surface. A pair of inverted and generally "L" shaped channel members 72 are secured by suitable means such as welding to the plate 71. The clamping device 70 is secured by suitable means such as fasteners 73 to a pair of plate members 74 and 75 which are secured to each other by means such as welding. The plate members 74 and 75 are located within the channel members 72 such that an upper surface of the plate member 74 is substantially flush with an upper surface of the channel members 72. A self curing epoxy 73a of 80 shore (A) urethane is poured into the space defined by the channel members 72 to lock or secure the plate members 74 and 75 to the plate 71.

Referring to FIGS. 2 through 6, the clamping device 70 includes a base member 76 and a pair of spaced side walls 77 extending generally vertically from the base member 76. The base member 76 is removably secured to the plate members 74 and 75 by the fasteners 73. A pair of spaced support plates 78 having a generally right triangle shape are secured to the side walls 77 and base member 76 by means such as welding to support the side walls 77 in the vertical position. A fluid cylinder 80 is secured to the base member 76 and is disposed between the side walls 77. The fluid cylinder 80 has a movable piston (not shown) disposed therein. A rod member 82 has one end secured to the piston and extends upward through the end of the fluid cylinder 80. The other end of rod member 82 is operatively connected to a pair of jaw members 84. The jaw members 84 include a bearing member 86 disposed about a bearing shaft 88. The bearing shaft 88 is secured at each end by a fastener 90 to a plate member 92. The plate member 92 is fixedly secured to the side wall 77 by suitable means such as fasteners 94. The bearing member 86 allows the jaw member 84 to pivot or rotate about the bearing shaft 88.

As previously stated, the jaw members 84 are operatively connected to the upper end of the rod member 82. More specifically, a "T" shaped member 96 is secured to the free end of the rod member 82. A pair of links 98 are disposed on both sides of the jaw member 84. One end of the link 98 is disposed about or secured to the T-shaped member 96 and the other end is disposed about a shaft 100 passing through the jaw member 84. As the rod member 82 is extended or retracted, the links 98 move and pivotally rotate the jaw members 84 between open and closed positions.

The jaw members 84 have a generally arcuate recess 102 formed near the inner and upper end thereof. The recess 102 receives either the cylindrically or spherically shaped end 57 or 58 of the pin members 54 or 55, respectively. The jaw member 84 includes a pair of vertically spaced rollers 104 journalled about shaft members 106. The jaw member 84 may include an additional pair of laterally spaced rollers 108 journalled about shaft members 110 to receive the spherically shaped end 58. The jaw members 84 also include a stop member 112 secured by fasteners 114 to the upper end thereof to limit or stop the upward movement the lower end 57 or 58 of the locator pins 54 or 55 relative to the jaw members 84.

In operation, the jaw members 84 are in a closed position as shown in solid lines in FIG. 5. When the rod member 82 is retracted, the T-shaped member 96 pulls on the links 98 causing them to move downward and, in turn, moves the lower end of the jaw members 84 toward the base member 76. Since the jaw members 84 are pivotally secured about the bearing shafts 88, the jaw members 84 pivotally rotate to an open position shown in phantom lines. This allows the lower end 57 or 58 of the locator pin 54 or 55 to be released. The operation is reversed for closing of the jaw members 84.

Typically, a vehicle body 11 is placed on the locator pins 54 and 55 at a loading station. The carrier 12 moves the pallet 14 along the rail 16 to the next working cell. When the pallet 14 is disposed over the clamping devices 70 in the working cell, the jaw members 84 of the clamping devices 70 are in the open position and the cylindrical and spherical shaped lower ends 57 and 58 of the locator pins 54 and 55, respectively, are aligned or orientated to be disposed within the jaw members 84. The fluid cylinder 80 is then actuated and the jaw members 84 move to a closed position to trap these lower ends 57 and 58 of the locator pin 54 and 55 within the recess 102 of the clamping device 70. When this occurs, the locator pins 54 and 55 are located and temporarily or removably secured to the clamping devices 70 such that a reference or location is always established with respect to the clamping devices 70. Robots may then perform the necessary welding on the vehicle body 11 at that working cell. Once the welding operation is complete, the fluid cylinder 80 is actuated to open the jaw members 84 as illustrated in phantom lines in FIG. 5. The carrier 12 then moves the pallet 14 along the rail 16 to the next working cell.

The present invention also provides a method of creating a plurality of standard working cells to perform various working operations. For example, in a typical assembly plant, approximately seventy-one (71) working cells are created. The present invention eliminates the necessity of relocating the vehicle body 11 seventy-one times because the vehicle body 11 which rests upon the locator pins 54 and 55 is directly located by the clamping devices 70.

In the present method, a master pallet 14 is constructed. To create the master pallet 14, the locator pins 54 and 55 are designed with a threaded section (not shown) to enable them to be connected and disconnected to a locating fixture (not shown). The locator pins 54 or 55 are secured to the fixture and positioned thereon with gauges in a nominal working position. The clamping devices are clamped to the lower end 57 or 58 of the locator pins 54 and 55 respectively, and suspended from the master pallet 14. The master pallet 14 is then moved along the rail 12 to a standard working cell. The plate members 74 and 75 are secured between the channel members 72 by pouring a self curing epoxy 73a of 90 shore (A) urethane in the space therebetween. The fixture is then removed from the pallet leaving the pins movably secured to the clamping devices 70. The pallet 14 is then brought to the standard working cell and the locator pins 54 and 55 are locked to the pallet 14 by pouring a self curing urethane within the space 65 of the arms 46 and 48. The operation is then repeated to create multiple working cells.

Accordingly, the cylindrically shaped lower end 57 allows relative axial movement between the locator pin 54 and clamping device 70 when disposed within and secured by the clamping device 70. The two opposed corners of the pallet 14 have locator pins 55 with the spherically shaped lower ends 58 which do not move laterally or axially when disposed within and secured by the clamping devices 76. This is required to allow accurate clamping of the locator pins to the clamping devices.

The present invention has been described in an illustrative manner. It is to be understood that the terminology which has been used is intended to be in the nature of words of description rather than of limitation.

Many modifications and variations of the present invention are possible in light of the above teachings. It is, therefore, to be understood that within the scope of the appended claims, the present invention may be practiced otherwise than as specifically described.

What is claimed is:

1. A vehicle body welding system including a carrier for moving a preliminary preassembled vehicle body to a working cell, comprising:
   pallet means operatively connected to the carrier and suspended above a support surface by the carrier;
   locator means operatively attached to said pallet means for supporting the vehicle body in a predetermined spaced relation to said pallet means; and
   clamping means secured to the support surface for locating and securely releasably engaging said locator means whereby the vehicle body is located in a precise predetermined spaced relation to said clamping means within the working cell.

2. A system as set forth in claim 1 wherein said locator means comprises a locator pin having a lower end and a point shaped upper end, the vehicle body resting upon said upper end.

3. A system as set forth in claim 2 wherein said lower end is spherically shaped.

4. A system as set forth in claim 2 wherein said lower end is cylindrically shaped.

5. A system as set forth in claim 2 wherein said pallet means comprises a plurality of laterally and longitudinally spaced arms.

6. A system as set forth in claim 5 wherein said arms have a generally vertical portion and horizontal portion, said locator pin being attached to said horizontal portion.

7. A system as set forth in claim 6 wherein said clamping means comprises a clamping device having a pair of jaws moveable between closed and open positions for engaging and disengaging said lower end of said locator pin.

8. A vehicle body welding system including a carrier for moving a preliminary preassembled vehicle body to a working cell, comprising:
   pallet means operatively connected to the carrier and suspended above a support surface by the carrier;
   locator means operatively attached to said pallet means for supporting the vehicle body in spaced relation to said pallet means;
   clamping means secured to the support surface for locating and removably securing said locator means to said clamping means to allow the vehicle body to be located in spaced relation to said clamping means within the working cell; and
   said locator means comprising a locator pin having a lower end and a point shaped upper end, the vehicle body resting upon said upper end.

9. A system as set forth in claim 8 wherein said clamping means comprises a clamping device having a pair of jaws moveable between closed and open positions for engaging and disengaging said lower end of said locator pin.

10. A vehicle body welding system including a carrier for moving a preliminary preassembled vehicle body to a working cell, comprising:
    pallet means operatively connected to the carrier and suspended above a support surface by the carrier;
    locator means operatively attached to said pallet means for supporting the vehicle body in spaced relation to said pallet means;
    clamping means secured to the support surface for locating and removably securing said locator means to said clamping means to allow the vehicle body to be located in spaced relation to said clamping means within the working cell;

locator means comprising a plurality of locator pins having a lower end and a point shaped upper end, the vehicle body resting upon said upper end;

wherein said lower end of at least one of said locator pins is spherically shaped;

wherein said lower end of at least another one of said locator pins is cylindrically shaped;

pallet means comprises a plurality of laterally and longitudinally spaced arms;

said arms having a generally vertical portion and horizontal portion, said locator pin being attached to said horizontal portion; and clamping means comprising a plurality of clamping devices each having a pair of jaws moveable between closed and open positions for engaging and disengaging respective of said lower ends of said locator pins whereby said locating pins and said clamping means cooperate to accurately position said vehicle body within said working cell.

11. A method of creating a plurality of standard working cells to allow various working operations to be performed, said method including the steps of:

constructing a master pallet adapted to move along a carrier from one working cell to another;

securing a plurality of locator pins to a master fixture;

transferrring the precision of the master fixture to at least one master pallet by fastening the locating pins to the master pallet by means of a self curing epoxy agent while the locator pins are held in position by the master fixture;

securing a clamping device to each of the plurality of locator pins and suspending the clamping devices from the master pallet;

moving the master pallet along the carrier to a working cell;

locating a bottom end of each clamping device between a pair of spaced channel members in a support surface;

pouring a material in a space between the bottom end and the channel members; and securing the clamping device to the support surface.

* * * * *